United States Patent [19]

Cichanowski

[11] Patent Number: 4,586,111

[45] Date of Patent: Apr. 29, 1986

[54] CAPACITOR WITH DIELECTRIC COMPRISING A POLYMER OF POLYACRYLATE POLYETHER PRE-POLYMER

[75] Inventor: Stanley W. Cichanowski, Bennington, Vt.

[73] Assignee: SFE Technologies, San Fernando, Calif.

[21] Appl. No.: 636,638

[22] Filed: Aug. 1, 1984

[51] Int. Cl.$^4$ .............................................. H01G 4/08
[52] U.S. Cl. ................................................... 361/323
[58] Field of Search ....................... 361/323, 311–315

[56] References Cited

U.S. PATENT DOCUMENTS

| | | | |
|---|---|---|---|
| 2,842,726 | 7/1958 | Robinson et al. | 361/323 X |
| 3,264,536 | 8/1966 | Robinson et al. | 361/323 |
| 3,319,141 | 5/1967 | Cariou et al. | 361/323 |
| 3,649,892 | 3/1972 | Booe | 361/323 X |
| 3,654,532 | 4/1972 | Rayburn | 361/323 X |
| 3,665,269 | 5/1972 | Wright et al. | 361/323 |

FOREIGN PATENT DOCUMENTS 789746 7/1968 Canada ............................... 361/323

*Primary Examiner*—Donald A. Griffin
*Attorney, Agent, or Firm*—Christie, Parker & Hale

[57] ABSTRACT

Capacitors comprising at least one electrode pair, the electrodes of the pair, and the electrode pairs, if more than one, being separated by a dielectric member, said dielectric member comprising a polymer of at least one polyacrylate polyether pre-polymer. The capacitor structure may comprise a single dielectric coating separating two electrodes, or it may comprise a plurality of alternating electrode layers and dielectric coatings.

12 Claims, No Drawings

CAPACITOR WITH DIELECTRIC COMPRISING A POLYMER OF POLYACRYLATE POLYETHER PRE-POLYMER

FIELD OF THE INVENTION

The present invention relates to dielectrics for use in electrical capacitors and more particularly relates to polyacrylate polyether pre-polymers and polymers thereof for use as the capacitor dielectric.

CROSS REFERENCES

This invention is related to the following copending, commonly assigned, U.S. patent applications and patents Ser. No. 562,779 filed Dec. 19, 1983, now abandoned entitled Miniaturized Monolithic Multi-layer Capacitor And Apparatus And Method for Making; Pat. No. 4,449,520, filed Feb. 12, 1985, entitled "Capacitor With Dielectric Comprising Poly-functional Acrylate Polymer And Method Of Making"; Pat. No. 4,490,774 issued Dec. 25, 1984, entitled "Capacitors Containing Polyfunctional Acrylate Polymers As Dielectrics"; Pat. No. 4,533,710, issued Aug. 6, 1985, entitled "1,2-Alkanediol Diacrylate Monomers And Polymers Thereof Useful As Capacitor Dielectrics"; Pat. No. 4,513,349, issued April 23, 1985, entitled "Acrylate-Containing Mixed Ester Monomers And Polymers Thereof Useful As Capacitor Dielectrics"; and Pat. No. 4,515,931, issued May 7, 1985, entitled "Polyfunctional Acrylate Monomers And Polymers Thereof Useful As Capacitor Dielectrics", all of which are hereby incorporated by reference.

BACKGROUND AND OBJECTS OF THE INVENTION

Capacitors are used in a wide variety of electrical circuits, for example in relatively high voltage AC power systems (such as the common 110-volt systems) and in relatively low voltage (e.g., under 50 volts) DC systems frequently encountered in printed circuits and the like. Important factors which must be considered in the manufacture of such capacitors are volumetric efficiency, temperature of operation, dissipation factor, especially in AC systems, and behavior upon failure.

The development of electronic devices and circuits of reduced size has led to a need for significantly smaller capacitors having increased volumetric efficiency, or capacitance per unit volume. The monolithic capacitor has been used for such applications.

A monolithic capacitor is one in which the layers of electrodes and dielectric are bonded together in a unitary structure as opposed, for example, to a metallized film capacitor in which self-supporting films are rolled or wound into the capacitor form. A miniaturized capacitor is one of very small dimensions, so as to be suitable for microcircuitry. Small overall size could denote low capacitance of little practical value, except that the thickness of the intervening dielectric layer inversely affects the capacitance between adjacent electrodes, and the number of electrode pairs and dielectric constant of the dielectric directly affects capacitance. Therefore, as a matter of basic capacitor theory, a capacitor having very thin dielectric layers, and many pairs of electrodes or a given capacitor with a dielectric having a high dielectric constant could have substantial capacitance despite being of miniature size with the active area of the electrodes being quite small.

One such type of monolithic multi-layer capacitor is described in application Ser. No. 562,779, cross-referenced herein. That capacitor has a capacitively active section, and two electrode joining sections, each separated from the active section by a sloping section. The capacitor includes a first and second set of electrode layers interleaved with one another, each layer of each set having an active area extending through and contributing to the capacitively active section of the capacitor in a stacked and spaced apart relationship with the active areas of all of the other layers. The electrode layers are joined at the margin in stacked electrically contacting relationship and each layer has a sloped portion between its active area and its margin which contributes to a sloped section of the capacitor. A dielectric coating is in contact with and between each adjacent electrode pair. The dielectric coating is a substantially uniform thickness in the capacitively active section and tapers to zero thickness through the sloping section.

The volumetric efficiency of a capacitor, including the monolithic multi-layer capacitor described above, is normally measured in terms of capacitance per unit volume. Generally, high efficiency is desirable, with values of at least about one-tenth (0.1) microfarad per cubic millimeter for a 50 VDC rated unit being preferred.

A wide variety of dielectrics are known and used in capacitors presently commercially available. Such dielectrics include polyethylene terephthalate, (more commonly known as Mylar ®—a trademark of Dupont), polycarbonates, polysulfones, polypropylene. The dielectric constant of these materials is generally less than about 4. More recently a wide variety of polyfunctional acrylate polymers and mixtures thereof useful as dielectrics were described in the patent applications cross-referenced above, particularly U.S. Pat. No. 4,499,520. The dielectric constant of these materials is also generally on the order of less than about 4.5 or so.

As a matter of basic capacitor theory, when such materials are used as dielectrics, the volumetric efficiency of the capacitor may be increased by reducing the thickness of the dielectric layer and/or by increasing the number of electrode pairs, both of which may have limits depending upon the capacitor type and its end use. Thus there remains a need for increasing the volumetric efficiency of a capacitor of a given size and structure by providing materials whose dielectric constant is higher than the dielectric constant of presently commercially available materials.

Accordingly, it is a principal object of the present invention to provide a capacitor having higher capacitance per unit volume. A related object is to provide a capacitor having a dielectric whose dielectric constant is higher than dielectrics heretofore provided.

It is yet another object to provide a monolithic multi-layer capacitor having higher capacitance per unit volume.

It is a further and more specific object of the invention to provide a capacitor which is well suited for direct current applications.

These and other objects and advantages of the invention will become apparent upon reading the detailed description. While the invention will be described in connection with the preferred embodiments, it will be understood that I do not intend to limit the invention to those embodiments. On the contrary, I intend to cover all alternatives, modifications and equivalents as may be included within the spirit and scope of the invention as defined by the appended claims.

DETAILED DESCRIPTION OF THE INVENTION

In accordance with the invention, there is provided a capacitor comprising at least two electrodes separated by a dielectric member comprising a polymer of at least one polyacrylate polyether pre-polymer. The capacitor is characterized by a relatively high volumetric efficiency owing to the increased dielectric constant of the polymer of the polyacrylate polyether pre-polymer. The polymer of the polyacrylate polyether pre-polymer is well-suited for use in capacitors generally, but is particularly well-suited for use in the monolithic capacitor described in application Ser. No. 562,779 cross-referenced herein.

While not being bound by any particular theory of operation, it is believed that, in general, orientation polarization is the principal dielectric polarization mechanism in polar polymers such as the polymers of the polyacrylate polyether pre-polymer described herein. Orientation polarization is believed to result from the thermally activated molecular motion of a polymer chain containing an asymmetric arrangement of permanent dipoles. Molecular motion and the number of and magnitude of net dipoles are both factors in the dielectric constant of a molecule. However, molecular motion is believed to contribute significantly to orientation polarization and thus dielectric constant of polymeric materials. It is the ability of the dipoles to move, and thus become oriented in the electric field that provides the dielectric properties of the molecule. Thus, for example, the static dielectric constant of a polymer would be expected to be low, independent of the number and magnitude of the net dipoles in the polymer, if the dipoles are immobile at the temperature of measurement.

In amorphous polymers, such as the polymer resulting from the polymerization of the polyacrylate polyether pre-polymers described herein, a major transition in molecular motion occurs at the glass-transition temperature (Tg) of the polymer. At the Tg large scale (or conformational) molecular motions are freed-up and noticeable mechanical property changes occur.

The polyacrylate polyether pre-polymers are thus characterized by their high dipole character and their molecular mobility at their temperature of use, typically about room temperature (25° C.). The ether linkages (C—O—C) in the backbone chain of the pre-polymer provide in-chain polarity and thus dipole character to the molecule. The ether linkages likewise provide the pre-polymer with inherent chain flexibility owing to the absence of steric hindrance and enhanced rotational freedom about the carbon-oxygen-carbon bonds and the Tg of the pre-polymers may thus be relatively low, for example, room temperature or somewhat higher. The polymers formed from the pre-polymers thus have the desired molecular mobility leading to a higher dielectric constant than other polymer not having such mobility, such as polycarbonates, polysulfones, and the like.

Polyacrylate polyether pre-polymers as described may be represented by the general formula:

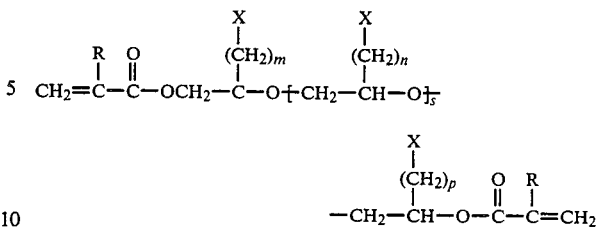

wherein R is hydrogen or an alkyl radical containing 1 to 5 carbon atoms; X may be H or a dipolar group such as halogen, carbonyl or nitrile; m, n and p each may be an integer from 0 to about 4; and s may be an integer of 0 or greater. The value of s, and thus the overall size of the molecule is not critical. Preferably s should be chosen so that the pre-polymer when deposited by vapor deposition forms a continuous pin-hole free film. Preferably, the value of s is less than about 20.

As previously noted R may be hydrogen or an alkyl radical containing from 1 to 5 carbon atoms. Ordinarily R is hydrogen or methyl and especially hydrogen. The term "acrylate" as used herein thus embraces both acrylates and alpha-substituted acrylates, including methacrylates and the like, although acrylates, that is, where R is hydrogen, are preferred because of the generally rapid rate at which they polymerize.

It will be appreciated that the values of m, n and p or branch length of the branches may be dependent on the component used to prepare the polyether backbone chain. Thus, for example, where ethylene oxide is used in the preparation of the polyether backbone chain, there will be no chain branching. On the other hand, if an alkylene oxide of three carbon atoms or greater is utilized, the number of carbon atoms in the branch will be two carbon atoms less than the total number of carbon atoms in the alkylene oxide compound used in preparing the polyether. Thus, if the polyether backbone chain is prepared from propylene oxide, the branch chain length will be one carbon atom, if the polyether backbone chain is prepared from butlyene oxide the branch chain length will be two, etc. The backbone chain may likewise be formed from a mixture of oxides, such as propyleneoxide and ethyleneoxide to effect a particular distribution of the branches on the polyether backbone chain.

For some applications it may be desirable to include in the pre-polymer strong dipolar groups, such as halogens, carbonyl, nitrile, and the like in order to increase the number of dipoles and the magnitude so as to increase the overall polarity of the pre-polymer. However, it will be appreciated that, in general, increased polarity because of the inclusion of such groups will increase the Tg of the polymer formed. Thus, preferably, such groups may be included provided the Tg is not so increased as to appreciably lower the dielectric constant of the polymer at the temperature of use.

The dielectric constant of the polymers formed from the pre-polymers described herein is higher than the dielectric constant of polymers heretofore utilized as the dielectric in capacitors. The polymers disclosed herein have a dielectric constant of at least about 6.

Polyacrylate polyether pre-polymers may be prepared by first forming a polyether polyol as is known to one skilled in the art, and then esterifying the polyether polyol with acrylic acid, as will likewise be apparent to one skilled in the art. For example, the acid and polyether polyol may be reacted in a suitable solvent, in the presence of a small amount of an acidic esterification catalyst such as sulfuric acid, p-toluenesulfonic acid, acidic ion exchange resins or acidified clays. Ordinarily, a stoichiometric excess of the acid is used, the ratio of equivalents of acid to diol typically being between about 2:1 and about 4:1. The reaction is ordinarily carried out at about 100°–200° C., most often about 100°–150° C. It is often preferred to incorporate in the esterification mixture a minor amount of a polymerization inhibitor such as p-methoxyphenol, 2,6-di-t-butylphenol or 2,4,6-tri-t-butylphenol. Acrylic acid may be replaced by a functional derivative thereof such as an acyl halide, lower alkyl ester or amide, with suitable modification of the reaction conditions. Similarly, incorporation of the dipolar halogen, carbonyl or nitrile moieties may be accomplished by techniques well known to those skilled in the art.

Polyacrylate polyether pre-polymers suitable for use in the preparation of monolithic, multi-layer capacitors of the type described in application Ser. No. 562,779, cross-referenced above, should have the chemical and physical properties described hereinafter to provide high quality capacitors capable of economic and efficient manufacture. Thus, the pre-polymer should be evaporable at the temperature employed to effect the vapor deposition of the pre-polymer such as at the temperatures described in application Ser. No. 562,779, and the pre-polymer should be capable of being provided in the form of a thin film on the order of about one micron or less. Further, the pre-polymers are preferably curable by thermal, by electron beam or by ultraviolet radiation. The pre-polymers are cross-linked upon polymerization to provide the structural integrity needed to provide high quality, tough dielectrics. The pre-polymer should thus be capable of being cross-linked or polymerized at a rate sufficiently rapid to be useful in the process described in application Ser. No. 562,779 so as to optimize the time required for the preparation of the monolithic capacitor. It is further desirable for certain applications, such as capacitors for alternating current applications, that the pre-polymer forms, alone or with other monomers, a polymer having a low dissipation factor and high thermal stability.

A wide variety of polyacrylate polyether pre-polymers may thus be used in the preparation of capacitors, including monolithic capacitors. Suitable polyacrylate polyether pre-polymers include unbranched glycol diacrylates such as diethylene glycol diacrylate, triethylene glycol diacrylate, tetraethylene glycol diacrylate and the like, as well as branched glycol diacrylates such as dipropylene glycol diacrylates, tripropylene glycol diacrylates, tetrapropylene glycol diacrylates and the like.

The polyacrylate polyether pre-polymers described herein may be polymerized under free-radical conditions, either alone or in the presence of other monomers. The term "polymer", as used herein, includes addition homopolymers and copolymers with one or more other monomers.

Polymerization by the free-radical method may be effected in bulk, solution, suspension or emulsion, by contacting the pre-polymer or pre-polymers with a polymerization initiator either in the absence or presence of a diluent at a temperature of about 0°–200° C. Suitable initiators include benzoyl peroxide, tertiary butyl hydroperoxide, acetyl peroxide, hydrogen peroxide, azobisisobutyronitrile, persulfate-bisulfite, persulfate-sodium formaldehyde sulfoxylate, chlorate-sulfite and the like. Alternatively, polymerization may be effected by irradiation techniques, as by ultraviolet, electron beam or plasma irradiation.

A large variety of polymerizable compounds can be used for copolymers with the polyacrylate polyether pre-polymers described. Polymerizable copolymers include:

1. Unsaturated alcohols such as allyl, methallyl, crotyl, 1-chloroallyl, 2-chloroallyl, cinnamyl, vinyl, methylvinyl, 1-phenallyl and butenyl alcohols; and esters of such alcohols with (i) saturated acids such as acetic, propionic, butyric, valeric, caproic and stearic, (ii) unsaturated acids such as acrylic, alpha-substituted acrylic (including alkylacrylic, e.g., methacrylic, ethylacrylic, propylacrylic, and the like, and arylacrylic such as phenylacrylic), crotonic, oleic, linoleic and linolenic; (iii) polybasic acids such as oxalic, malonic, succinic, glutaric, adipic, pimelic, suberic, azelaic and sebacic; (iv) unsaturated polybasic acids such as maleic, fumaric, citraconic, mesaconic, itaconic, methylenemalonic, acetylenedicarboxylic and aconitic; and (v) aromatic acids, e.g., benzoic, phenylacetic, phthalic, terephthalic and benzoylphthalic acids;
2. Unsaturated acids (examples of which appear above) and esters with lower saturated alcohols, such as methyl, ethyl, propyl, isopropyl, butyl, isobutyl, sec-butyl, tert-butyl, 2-ethylhexyl and cyclohexyl alcohols, and with saturated lower polyhydric alcohols such as ethylene glycol, propylene glycol, tetramethylene glycol, neopentyl glycol and trimethylolpropane.
3. Unsaturated lower polyhydric alcohols, e.g., butenediol, and esters thereof with saturated and unsaturated aliphatic and aromatic, monobasic and polybasic acids, examples of which appear above.
4. Esters of the above-described unsaturated acids, especially acrylic and methacrylic acids, with higher molecular weight monohydroxy and polyhydroxy materials such as decyl alcohol, isodecyl alcohol, oleyl alcohol, stearyl alcohol, epoxy resins and polybutadiene-derived polyols.
5. Vinyl cyclic compounds including styrene, o-, m-, p-chlorostyrenes, bromostyrenes, fluorostyrenes, methylstyrenes, ethylstyrenes and cyanostyrenes; di-, tri-, and tetrachlorostyrenes, bromostyrenes, fluorostyrenes, methylstyrenes, ethylstyrenes, cyanostyrenes; vinylnapthalene, vinylcyclohexane, divinylbenzene, trivinylbenzene, allylbenzene, and heterocycles such as vinylfuran, vinylpridine, vinylbenzofuran, N-vinylcarbazole, N-vinylpyrrolidone and N-vinyloxazolidone.
6. Unsaturated ethers such as methyl vinyl ether, ethyl vinyl ether, cyclohexyl vinyl ether, octyl vinyl ether, diallyl ether, ethyl methallyl ether and allyl ethyl ether.
7. Unsaturated ketones, e.g., methyl vinyl ketone and ethyl vinyl ketone.
8. Unsaturated amides, such as acrylamide, methacrylamide, N-methylacrylamide, N-phenylacrylamide, N-allylacrylamide, N-methylolacrylamide, N-allylcaprolatam, diacetone acrylamide, hydroxymetholated diacetone acrylamide and 2-acrylamido-2-methylpropanesulfonic acid.
9. Unsaturated aliphatic hydrocarbons, for instance, ethylene, propylene, butenes, butadiene, isoprene, 2-chlorobutadiene and alpha-olefins in general.

10. Unsaturated alkyl halides, e.g., vinyl fluoride, vinyl chloride, vinyl bromide, vinylidene chloride, vinylidene bromide, allyl chloride and allyl bromide.
11. Unsaturated acid anhydrides, e.g., maleic, citraconic, itaconic, cis-4-cyclohexene-1,2-dicarboxylic and bicyclo(2.2.1)-5-heptene-2,3-dicarboxylic anhydrides.
12. Unsaturated acid halides such as cinnamyl acrylyl, methacrylyl, crotonyl, oleyl and fumaryl chlorides or bromides.
13. Unsaturated nitriles, e.g., acrylonitrile, methacrylonitrile and other substituted acrylonitriles.

As stated above, the pre-polymers disclosed herein are very useful a dielectric compositions in capacitors because of their adaptability to the production of capacitors with high volumetric efficiency and with low dissipation factors particularly at about room temperature (i.e., about 25° C.).

Capacitors utilizing the pre-polylmers disclosed herein may be formed of materials and in configurations known in the art. The conductive materials are typically aluminum, copper, zinc, tin, stainless steel and alloys thereof, with aluminum being preferred. For example, the present invention provides a capacitor which includes a first electrode which may be, for example, aluminum foil, a dielectric coating of a polymer of a polyacrylate polyether pre-polymer which may be formed by deposition of a polyacrylate polyether pre-polymer, optionally in solution, on the surface of the first electrode by, for example, vacuum evaporation, roller coating, flowing, spraying, dipping, brushing, spin coating, drawing down or the like, evaporation of any solvent, and suitable polymerization and a second electrode which is a thin metallized layer preferably of aluminum deposited on the dielectric film. Suitable leads are attached to the first and second electrodes.

The present invention likewise provides monolithic multi-layer capacitors such as those described and claimed in application Ser. No. 562,799. Capacitors of this type (described generally at pages 3 and 4 herein) may be produced by depositing alternating electrode and dielectric layers so as to provide alternate electrode layers with portions projecting from the stack and contacting each other in electrically connected relation as more fully described in that application. The dielectric coating comprises a polymer of a polyacrylate polyether pre-polymer which is formed by the vapor deposition of the pre-polymer on the electrode and subsequent polymerization of the pre-polymer. The use of electron beam polymerization is particularly preferred because it provides rapid polymerization of the pre-polymer without the need for additional curing agents, and thus leads to economical production of very thin coatings.

The following Example is illustrative of the present invention and not in limitation thereof.

EXAMPLE 1

This Example illustrates the preparation of uniform prototype capacitors employing polyacrylate polyether pre-polymers, and for comparative purposes a polyacrylate pre-polymer free of an ether backbone chain is also included.

Uniform prototype capacitors were produced by drawing down a pre-polymer layer on an aluminum foil substrate, polymerizing the layer by contact with a 10-megarad electron beam, and depositing a metallic aluminum layer thereon. The thickness of the aluminum foil electrode was 12.5 microns, that of the dielectric layer was 3-6 microns and that of the deposited aluminum electrode was 300-500 Angstroms (0.03-0.05 micron). The area of each prototype capacitor was about 1 square inch.

The following pre-polymers were used in each of Examples 1a, 1b, and 1c. In Example 1a, the pre-polymer is SR-268, which is tetraethylene glycol diacrylate. This pre-polymer has a molecular weight of 302, a density at 25° C. of 1.115-1.125 and a viscosity at 25° C. of 50 cps. In Example 1b, the pre-polymer is SR-230, which is diethylene glycol diacrylate. This pre-polymer has a molecular weight of 214, a density at 25° C. of 1.1110 and a viscosity at 25° C. of 24 cps. In Example 1c, the pre-polymer is SR-238, which is 1,6-hexanediol diacrylate. This pre-polymer has a molecular weight of 226, a density at 25° C. of 1.010 and a viscosity at 25° C. of 12 cps. Sr-268, Sr-230 and Sr-238 are commercially available from SARTOMER Company, a subsidiary of Atlantic Richfield Company.

The dissipation factors %D of the test capacitors were measured at 60 Hz. using an AC bridge and the dielectric constants for the dielectric of the test capacitors were calculated based on the measured capacitance observed at 100 Hz. on a Hewlett-Packard LCR bridge at room temperature, about 25° C. Four prototype capacitors were made for each of the pre-polymers. The thickness (T) of the dielectric coating (in microns), the measured capacitance (C) in nanofarads, the dielectric constant (DK) and dissipation factor (%D) of the capacitor for each test are given in the following table:

TABLE I

| Ex. No. | Pre-Polymer | Test No. | T | C | DK | % D 30° C. | % D 85° C. |
|---|---|---|---|---|---|---|---|
| 1a | SR-268 | 1 | 4.13 | 8.94 | 6.40 | | |
| | | 2 | 4.51 | 8.52 | 6.7 | | |
| | | 3 | 5.04 | 7.74 | 6.8 | | |
| | | 4 | 4.85 | 8.34 | 7.0 | | |
| | | 5 | — | — | | 1.5 | 3.6 |
| 1b | SR-230 | 1 | 5.3 | 6.45 | 5.92 | | |
| | | 2 | 4.51 | 8.13 | 6.36 | | |
| | | 3 | 4.56 | 8.11 | 6.42 | | |
| | | 4 | 4.22 | 8.24 | 6.04 | | |
| | | 5 | — | — | | 1.1 | 1.05 |
| 1C | SR-238 | 1 | 4.66 | 5.43 | 4.39 | | |
| | | 2 | 5.06 | 5.51 | 4.84 | | |
| | | 3 | 4.93 | 5.59 | 4.79 | | |
| | | 5 | — | — | | 0.8 | 1.10 |

The data above illustrate the improved volumetric efficiency of capacitors in which the dielectric is formed from pre-polymers of the type disclosed herein. It can be seen that the dielectric constant of a dielectric prepared from a polyacrylate polyether pre-polymer is significantly greater than the dielectric constant of a dielectric prepared from an acrylate pre-polymer free of ether linkages in the backbone chain of the pre-polymer. It can further be seen that capacitors especially suited for direct current applications can be prepared using the polyacrylate polyether pre-polymers disclosed herein owing to the improved dielectric constant of the dielectric formed therefrom.

Capacitors also useful for alternating current applications may likewise be prepared, depending on the dissipation factor of the dielectric. Thus for the pre-polymer used in Example 1a, capacitors would be satisfactory for AC use at about 30° C. or lower, while for the pre-polymer used in Example 1b, capacitors would be suitable for use at least up to about 85° C.

Thus, as can be seen from the foregoing description and illustrative example, the present invention provides capacitors which have an improved volumetric efficiency due to the high dielectric constant of the dielectric formed from the polyacrylate polyether pre-polymer. The capacitors are particularly well suited to direct current applications, but, depending on the polyacylate polyether pre-polymer, may likewise be useful for certain alternating current applications.

I claim:

1. A capacitor comprising at least one electrode pair, the electrodes of the pair, and the electrode pairs, if more than one, being separted by a dielectric member, said dielectric member comprising a polymer of at least one polyacrylate polyether pre-polymer of the formula:

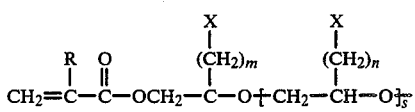

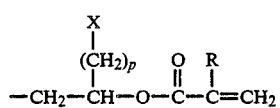

wherein R is hydrogen or an alkyl of from 1 to 5 carbon atoms; X is hydrogen or a dipolar group selected from the group consisting of halogen, carbonyl or nitrile; m, n and p each may be an integer from 0 to about 4; and s is an integer of at least zero provided that the value of s is such that upon vapor deposition the pre-polymer forms a continuous pin-hole free film.

2. A capacitor as claimed in claim 1 wherein the electrodes are aluminum.

3. A capacitor as claimed in claim 1 wherein the polyacrylate polyether pre-polymer is an unbranched glycol diacrylate.

4. A capacitor as claimed in claim 3 wherein the unbranched glycol diacrylate is diethylene glycol diacrylate, triethylene glycol diacrylate or tetraethylene glycol diacrylate.

5. A capacitor as claimed in claim 1 wherein the polyacrylate polyether pre-polymer is a branched glycol diacrylate.

6. A capacitor as claimed in claim 5 wherein the branched glycol diacrylate is dipropylene glycol diacrylate, tripropylene glycol diacrylate or tetrapropylene glycol diacrylate.

7. A monolithic multi-layer capacitor having a capacitively active section, and two electrode joining sections, each separated from the active section by a sloping section, said capacitor comprising first and second sets of electrode layers interleaved with one another, each layer of each set having an active area extending through and contributing to the capacitively active section of the capacitor in a stacked and spaced apart relationship with the active areas of all the other layers and each layer having an electrode joining margin in a stacked electrically contacting relationship with the margins of the other layers in its set so as to form an electrode joining section of the capacitor, and each layer having a sloped portion running between its active area and its margin contributing to a sloped section of the capacitor, and a dielectric coating in adherent contact with and between each adjacent electrode layer pair, said dielectric coating being of substantially uniform thickness in the capacitively active section and tapering to zero thickness through the sloping section, said dielectric coating comprising a polymer of at least one polyacrylate polyether pre-polymer of the formula

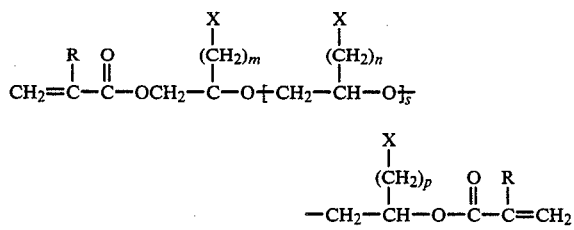

wherein R is hydrogen or an alkyl of from 1 to 5 carbon atoms; X is hydrogen or a dipolar group selected from the group consisting of halogen, carbonyl and nitrile; m, n and p each may be an integer from 0 to about 4; and s is an integer of at least zero provided that the value of s is such that upon vapor deposition the pre-polymer forms a continuous pin-hole free film.

8. A capacitor as claimed in claim 7 wherein the electrodes are aluminum.

9. A capacitor as claimed in claim 7 wherein the polyarylate polyether pre-polymer is an unbranched glycol diacrylate.

10. A capacitor as claimed in claim 9 wherein the unbranched glycol diacrylate is diethylene glycol diacrylate, triethylene glycol diacrylate or tetraethylene glycol diacrylate.

11. A capacitor as claimed in claim 7 wherein the polyacrylate polyether pre-polymer is a branched glycol diacrylate.

12. A capacitor as claimed in claim 11 wherein the branched glycol diacrylate is dipropylene glycol diacrylate, tripropylene glycol diacrylate or tetrapropylene glycol diacrylate.

* * * * *